United States Patent
Vives et al.

(10) Patent No.: US 6,439,688 B1
(45) Date of Patent: Aug. 27, 2002

(54) TECHNIQUE FOR PRINTING A BAR CODE WHILE CONSERVING COLORANT

(75) Inventors: Juan Carlos Vives, San Diego; Ronald D Stephens, Jr., Escondido, both of CA (US); Xavier Bruch, Sant Cugat del Valles Barcelona (ES)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/505,752

(22) Filed: Feb. 16, 2000

Related U.S. Application Data

(63) Continuation of application No. 09/302,611, filed on Apr. 30, 1999.

(51) Int. Cl.⁷ .................................................. B41J 2/25
(52) U.S. Cl. ........................ 347/43; 347/15; 235/462.04
(58) Field of Search ............................... 347/12, 15, 40, 347/41, 43; 358/457; 235/462.01, 462.02, 462.04

(56) References Cited

U.S. PATENT DOCUMENTS

| | | | |
|---|---|---|---|
| 4,222,557 A | 9/1980 | Wu | 271/4 |
| 4,679,953 A | 7/1987 | Sone et al. | 400/625 |
| 4,890,825 A | 1/1990 | McCormick et al. | 271/188 |
| 5,291,227 A | 3/1994 | Suzuki | 347/104 |
| 5,418,574 A | 5/1995 | Miyabata | |
| 5,421,660 A | 6/1995 | Aizawa et al. | 400/625 |
| 5,479,199 A | 12/1995 | Moore et al. | 347/102 |
| 5,581,284 A * | 12/1996 | Hermanson | 347/43 |
| 5,663,750 A | 9/1997 | Sakuma | 347/7 |
| 5,748,207 A * | 5/1998 | Inui et al. | 347/43 |
| 5,767,876 A * | 6/1998 | Koike et al. | 347/43 |
| 5,777,758 A | 7/1998 | Tanabe | 358/457 |
| 5,798,776 A * | 8/1998 | Uchiyama et al. | 347/43 |
| 5,812,156 A | 9/1998 | Bullock et al. | 347/19 |
| 5,870,077 A | 2/1999 | Dillinger et al. | 345/153 |
| 5,883,655 A | 3/1999 | Szlucha | 347/104 |
| 5,921,406 A | 7/1999 | Leone | 211/50 |
| 5,921,690 A | 7/1999 | Shinmachi et al. | 400/625 |
| 6,062,674 A * | 5/2000 | Inui et al. | 347/43 |
| 6,270,187 B1 * | 8/2001 | Murcia et al. | 347/43 |

FOREIGN PATENT DOCUMENTS

| | | | |
|---|---|---|---|
| EP | 0 595 650 | 5/1994 | B41J/2/21 |
| EP | 0 739 127 | 10/1996 | H04N/1/60 |
| EP | 0 828 228 | 3/1998 | G06K/15/10 |
| JP | 09216388 | 8/1997 | B41J/2/21 |

OTHER PUBLICATIONS

US Patent Application SN 09/302,611; Filed Apr. 30, 1999 Title: "Method and Apparatus for Balancing Colorant Usage".

* cited by examiner

*Primary Examiner*—Lamson D. Nguyen

(57) ABSTRACT

A technique of forming a bar of a bar code on print media by a printing device having a plurality of colorants. Each one of the individual bars has a leading edge and a trailing edge that help to define a central region of the bar. The relative locations of the leading edge and trailing edge are determined and a first colorant, usually black, is deposited at the leading edge. A composite of the first colorant, and the other printhead colorants, are deposited in the central region while the first colorant is deposited at the trailing edge. A bar of a bar code produced by this technique has a clearly defined leading and trailing edge for bar code readers to measure while the central region of the bar includes a composite of colorants.

13 Claims, 3 Drawing Sheets

TECHNIQUE FOR PRINTING A BAR CODE WHILE CONSERVING COLORANT

CROSS REFERENCE TO RELATED APPLICATIONS

This is a continuation in part patent application of copending patent application Ser. No. 09/302,611, filed Apr. 30, 1999, entitled "Method and Apparatus for Balancing Colorant Usage", said application and assigned to the assignee of the present invention. Said application is incorporated herein in its entirety, by reference.

BACKGROUND OF THE INVENTION

The present invention relates generally to ink-jet printing and, more particularly, to a technique for printing a bar code while conserving colorant during bar code printing operations.

Modern printing devices utilize an ink ejecting printhead that is often mounted in a carriage that is moved back and forth across print media, such as paper for example. As the printhead moves across the print media, a control system activates the printhead to deposit or eject ink droplets, or colorants, onto the print media to form images and text.

The printhead is sometimes fluidly coupled to an ink container that supplies ink to the printhead. The container may be a multi-chamber ink container that contains more than one colorant. Such containers typically contain one or more, of the following colorants: black, cyan, yellow and magenta. Each chamber of the multi-chamber ink container is fluidly coupled to the printhead.

A shortcoming of the multi-chamber ink container is that when any of the ink chambers of the container is depleted of ink, the entire ink container must be replaced, since the printing device is no longer capable of full color printing. Of course, discarding the entire multi-chamber container prevents the remaining colorants from being used, thereby causing waste. Thus, colorant management and conservation are important considerations in ink-jet printing operations.

A significant challenge to colorant management and conservation is presented in bar code printing. It is understood that a bar code is a code consisting of ink lines of varying widths that can be read optically with a scanning device to convert data represented by the bar code into digital signals. In many cases the bar codes are printed in monochrome and black is the colorant of choice.

Since modern ink-jet printers are equipped with printheads or containers having the four above-mentioned colorants, conventional methods of printing bar codes present shortcomings in both colorant management and conservation. In such cases, the printhead for black is actively utilized while the other printheads are relatively dormant. This is not a satisfactory condition because, in order to prevent the colorant from drying in the cyan, yellow and magenta printheads, it becomes necessary to interrupt a print process that usually entails spitting cyan, magenta and yellow colorant droplets into a spittoon during the print cycle. Each such spitting event entails waste of colorant inks. Nevertheless, in order to prevent loss of an entire printhead through the drying effect, conventional systems settle for less waste through the servicing technique.

Not only is the interruption of the print cycle to service the printheads wasteful, printhead servicing during the print cycle slows throughput. In addition, such servicing may effect adversely print quality. In summary, printhead servicing during bar code printing is a wasteful practice that reduces throughput and tends to diminish print quality.

From the foregoing it will be apparent that there is a need for a technique for printing bar codes wherein colorant waste is reduced. Desirably such a technique would afford improved throughput while affording good print quality.

DISCLOSURE OF THE INVENTION

The various bars of a bar code convey information according to the width of the individual bars. In this regard, in order for a bar code reader to operate, the reader must be able to "read" the widths of the individual bars. If each bar of the code is regarded as having a leading edge and a trailing edge, each parallel to the long axis of the bar, the bar code reader can read a bar by measuring the distance between the leading edge and the trailing edge.

According to the present invention, there is provided a technique of forming a bar of a bar code on print media by a printing device having a plurality of colorants. Each one of the individual bars has a leading edge and a trailing edge that help to define a central region of the bar. The relative locations of the leading edge and trailing edge are determined and a first colorant, usually black, is deposited at the leading edge. A composite of the first colorant, and the other printhead colorants, are deposited in the central region while the first colorant is deposited at the trailing edge. A bar of a bar code produced by this technique has a clearly defined leading and trailing edge for bar code readers to measure while the central region of the bar includes a composite of colorants.

The technique of the present invention, and the bar code bar produced by the process, afford several advantages. While the leading and trailing edges enable efficient bar code readings, the central region of the bar serves to receive a composite of the colorants. In this manner, the black colorant is conserved since it no longer necessary for it to fill the entire bar and the firing duty cycle for the black printhead is reduced by about 25%. The other colorants are conserved since the need for servicing the printhead by spitting ink at a service station is eliminated. As a result, throughput and print quality are enhanced because servicing trips to the service station are eliminated as composites of colorants are deposited in the central region of the bar rather than spitting ink at the service station.

In addition, the use of composite black colorant in the middle of the bar code does not impact scannability since the process is not random, on the fly spitting but is, instead, a directed process. Moreover, since the frequency of printhead nozzle servicing is reduced, throughput is increased. The novel technique of the present invention is applicable to any image or symbol intended to be scanned by a laser or optical scanner. It is especially useful in modern tag and label printers utilizing 1 inch swath printheads at 1-pass printing.

While the invention discussed herein relates to a technique for printing bar codes, it will be apparent to those skilled in the art that the technique is suitable also for any image or symbol that is intended to be printed or scanned with a laser or optical scanner.

Other aspects and advantages of the present invention will become apparent from the following detailed description, taken in conjunction with the accompanying drawings, illustrating by way of example the principles of the invention.

BEST MODE FOR CARRYING OUT THE INVENTION

As an aid to understanding the present invention, it will be helpful to consider first the construction of a bar code. In general, the bar code is comprised of monochromatic, often black, parallel bars. The information encoded in the bar code is conveyed to a reader by means of the varying widths of the individual bars. While the bars vary in width, the code itself is comprised of a plurality of parallel rectangles of generally uniform length.

According to the present invention, each individual bar is regarded as having a leading edge and a trailing edge. These edges are spaced apart and parallel to the long axis of the bar. A bar code reader measures the distance between the edges in order to determine the value represented by the bar. As a result, it is important for the edges to be clearly defined and black is often the colorant of choice for such definition.

The central region of the bar, arbitrarily defined as a region disposed between the leading edge and the trailing edge, is not as critical to the determination of bar value as the edges. Therefore, the deposition of black and other colorants in the central region of the bar will not impair the width measuring function of bar code readers. Such deposition, of course, eliminates trips to the spittoon for servicing and conserves both the black and other colorants.

Figure 1:
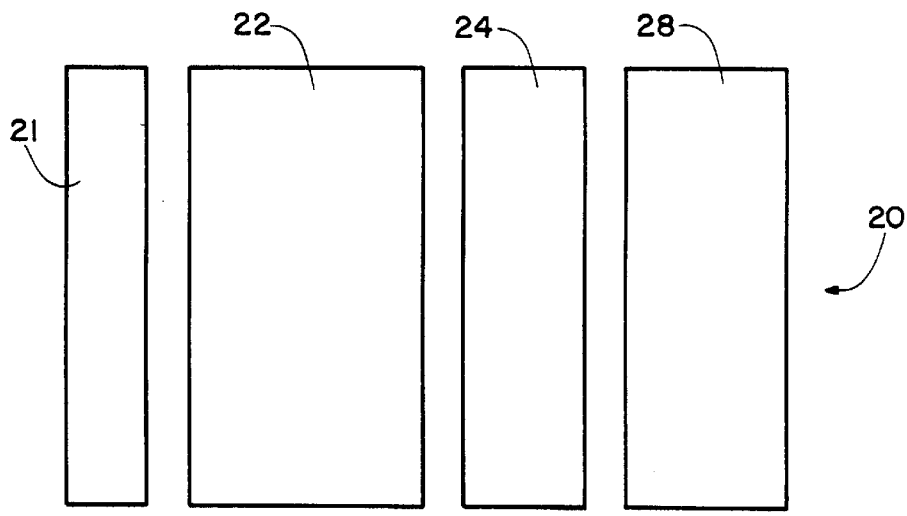
FIG. 1 is a schematic view of a prior art bar code comprised of four bars.

Referring now to FIG. 1 of the drawings, there is shown a schematic view of a prior art bar code 20 that is comprised of four elongated parallel and rectangular bars 21, 22, 24 and 28. The bars 21, 22, 24 and 28 are each are of the same length but of different widths respectively. The value of an individual bar is represented by the width of the bar.

Figure 2:
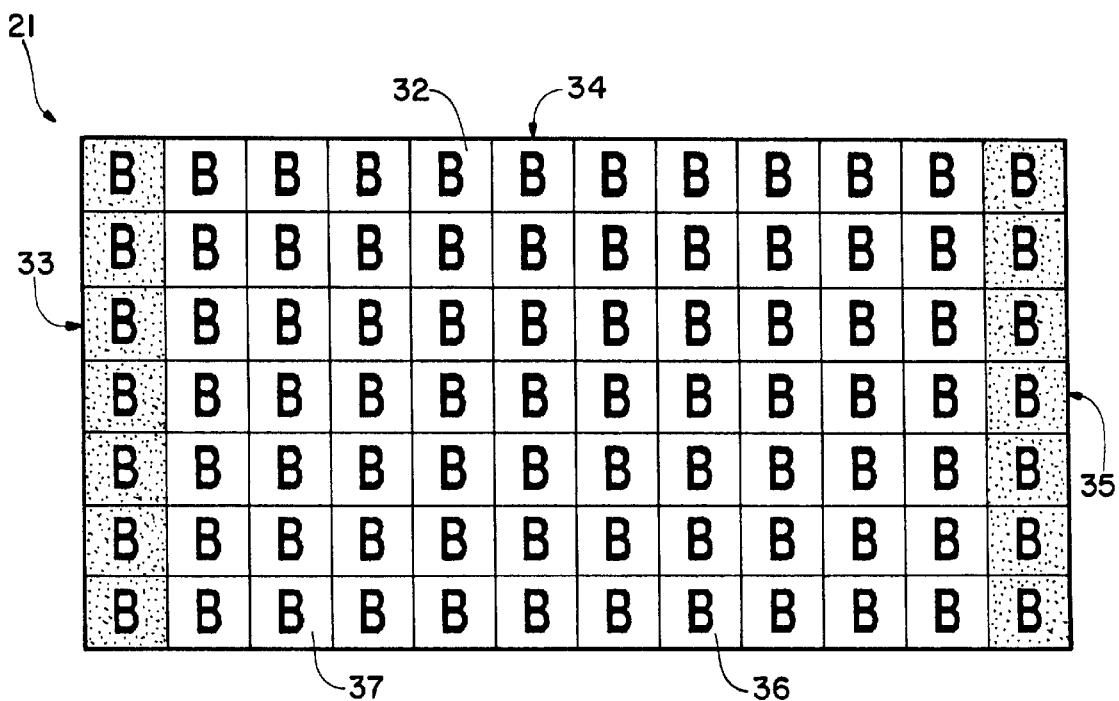
FIG. 2 is a schematic view of a portion of the bar code shown in FIG. 1 as such portion occurs in the prior art.

In FIG. 2 there is shown schematically the bar 21 of FIG. 1 that is constructed according to the prior art. It is to be understood that the bar 21 is representative of the bars 22, 24 and 28, as such are constructed according to the prior art.

The bar 21 is comprised of a plurality of pixels, such as the pixels 32, 36 and 37. The various pixels are distributed as to form a leading edge 33 and a trailing edge 35 (both shown stippled for illustration purposes), and a central bar region indicated generally by the reference numeral 34 (shown without stippling). It will be noted, with reference to the prior art bar 21, that all of the pixels, in the leading edge 33, the trailing edge 35 and the central region 34 are formed by black ink, represented in each pixel by the letter B.

Since all of the pixels of the bar 21 are black, the construction of the bar by a conventional printer having a plurality of colorants entails numerous trips to a spittoon during the printing process. As stated above, such printhead servicing is necessary in order to prevent drying of colorant in the printheads containing the non-black colorants. This technique is wasteful and it slows throughput. In addition, it is recognized that the interruption of a print job for printhead servicing can adversely affect print quality.

Figure 3:
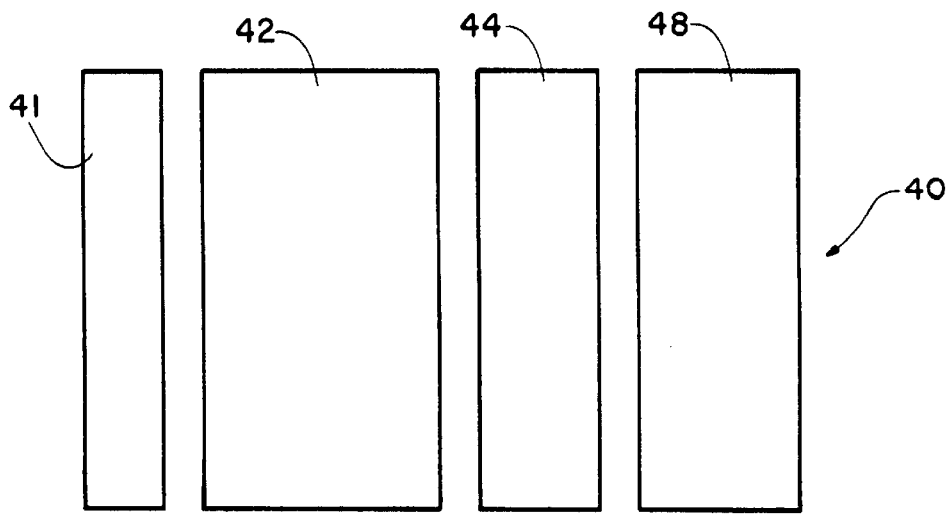
FIG. 3 is a schematic view of a portion of a bar code that is constructed according to the present invention.

In contrast to the prior art bar, there is schematically shown in FIG. 3 a bar code 40 that is constructed according to the present invention. The bar code 40 is comprised of four elongated parallel and rectangular bars 41, 42, 44 and 48 that are each of the same length but of different widths respectively. The value of an individual bar is represented by the width of the bar.

Figure 4:
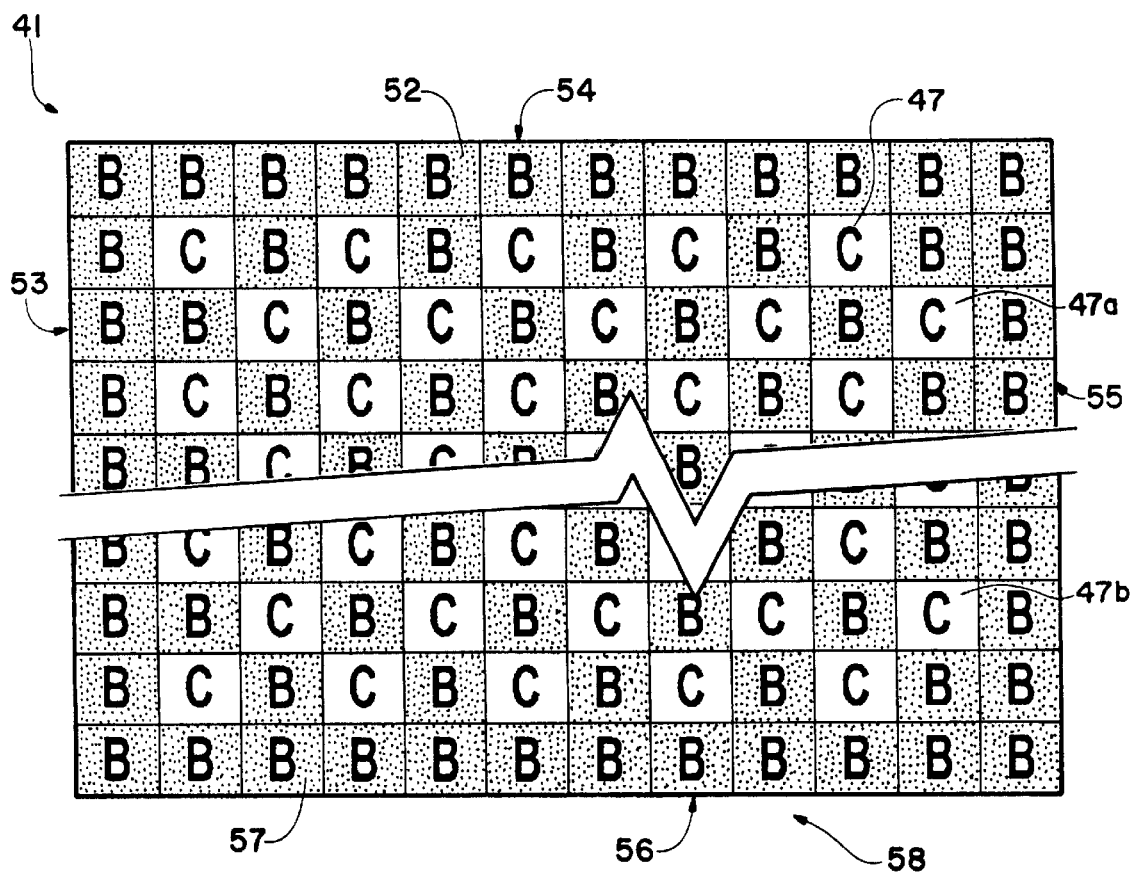
FIG. 4 is a schematic view of a portion of the bar code of FIG. 3.

In FIG. 4, the bar 41 is shown schematically. The bar is constructed according to the present invention and it is to be understood that it is representative of the bars 42, 44 and 48 of the bar code 40, as such is constructed according to the present invention.

The bar 41 is comprised of a plurality of pixels, such as the pixels 52, and 57. The bar 41 includes a top tier, generally indicated by the reference numeral 54, leading and trailing edges, generally indicated by the reference numerals 53 and 55, respectively, and a bottom tier generally indicated by the reference numeral 56. It will be recognized by the stippling that the pixels shown in the top tier 54, the leading and trailing edges 53 and 55, respectively, and in the bottom tier 56, are comprised of pixels containing the black colorant (represented by the letter B). A central checkerboard bar region, indicated generally by the reference numeral 58, is disposed between the leading and trailing edges 53 and 55, respectively, and the top and bottom tiers 54 and 56, respectively. It will be noted that, unlike the prior art bar 21, the bar 41 contains a plurality of pixels, such as the pixels 47, 47a and 47b that are comprised of a combination of colorant C, where C is a combination of cyan, magenta and yellow.

It will be readily appreciated by those skilled in the art that the composition of the bar 41 represents a novel technique for conservation and management of the cyan, magenta and yellow colorants by the use of the combination of colorants C in the central region pixels 47, 47a and 47b, for example. Because of the deposition of these colorants in the central bar region 58, spitting the colorants during printhead servicing is substantially eliminated while the black colorant is conserved. Moreover, since the need for wasteful printhead servicing during bar code printing is eliminated, throughput is improved. These advantages are realized without any compromise in bar quality since the leading and trailing edges 53 and 55, respectively, are capable of transmitting a clear signal to a bar code reader.

Figure 6:
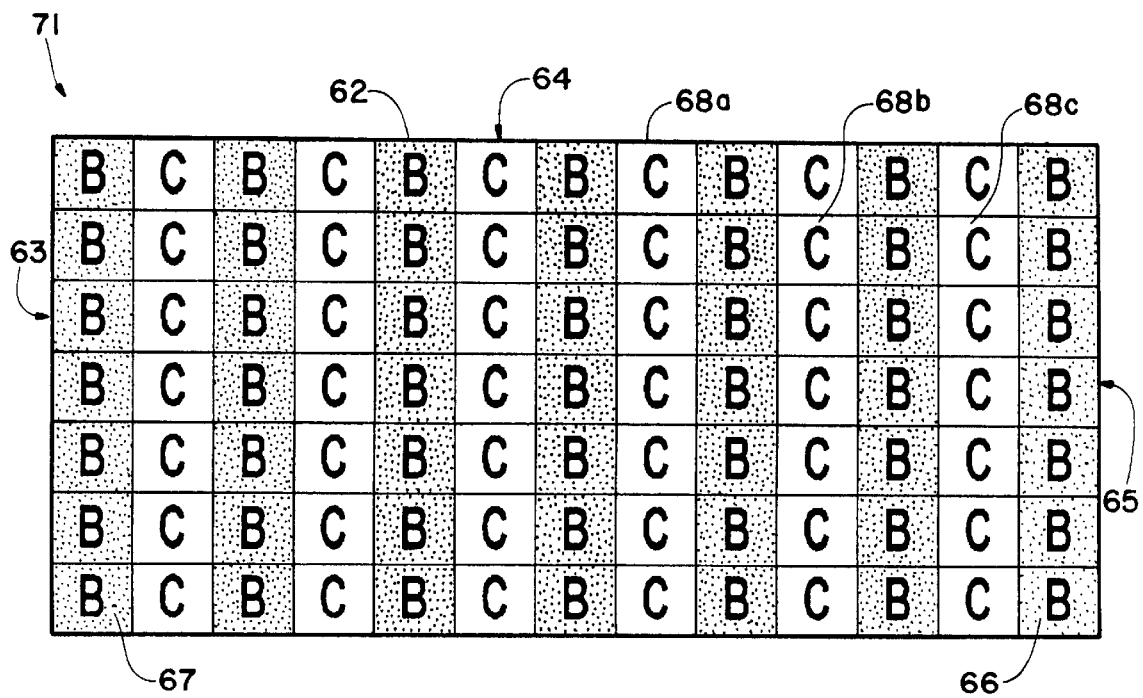
FIG. 6 is a schematic view of a portion of the bar code of FIG. 5.
Figure 5:
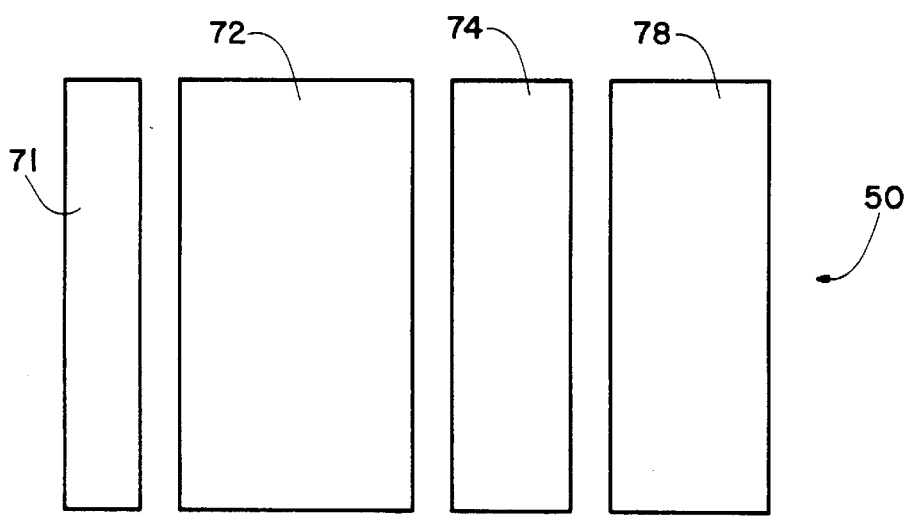
FIG. 5 is a schematic view of another bar code which is constructed in accordance with the present invention.

Referring now to FIGS. 5 and 6, there is shown schematically a bar code 50 that is another embodiment of the present invention. The bar code 50 includes a bar 71. The bar 71 is constructed according to the present invention and it is to be understood that it may be regarded as representative of bars 72, 74 and 78 of the bar code 50, as such is constructed according to the present invention.

The bar 71 is comprised of a plurality of pixels, such as the pixels 66 and 67 which, are shown as stippled and containing the letter B, indicative of the black colorant. The bar 71 includes leading and trailing edges 63 and 65, respectively, which define a central bar region indicated generally by the reference numeral 64. Once again, it will be noted that, unlike the prior art bar 21, the bar 71 contains a plurality of pixels, such as the pixels 68a, 68b and 68c, each containing the letter C. The pixels 68a, 68b and 68c are comprised of colorants other than black. These colorants, typically are cyan, magenta and yellow.

It will be readily appreciated by those skilled in the art that the composition of the bar 71 represents a novel technique for conservation and management of the cyan, magenta and yellow colorants by using these colorants in the central region pixels such as the pixels 68a, 68b and 68c. As in the prior embodiment, the black colorant (represented by the letter B), is utilized in all of the leading and trailing edge pixels of which the pixels 67 and 66, respectively are representative. By distributing colorants in this novel manner, the need for wasteful printhead servicing is eliminated and throughput is improved. As in the case of the other, above described embodiment, these advantages are realized without any compromise in bar quality since the leading and trailing edges 63 and 65, respectively, are capable of transmitting a clear signal to a bar code reader.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

It will be evident that there are additional embodiments and applications which are not disclosed in the detailed description but which clearly fall within the scope of the present invention. The specification is, therefore, intended not to be limiting, and the scope of the invention is to be limited only by the following claims.

What is claimed is:

1. A method of forming a bar code, comprising:

depositing a plurality of ink droplets onto a media sheet to form a plurality of bars indicative of the bar code, wherein each individual bar includes alternating column patterns of a column of black ink droplets and a column of combinations of color ink droplets, wherein each one of the combinations of color ink droplets includes a combination of magenta, cyan and yellow ink droplets to form a black pixel.

2. A bar of a bar code produced according to the process of claim 1.

3. The method according to claim 1, wherein said first colorant depositing step includes depositing a black colorant.

4. A bar of a bar code produced according to the process of claim 3.

5. The method according to claim 1, wherein said first colorant depositing step at said trailing edge location includes depositing a black colorant.

6. A bar of a bar code produced according to the process of claim 5.

7. A bar code including individual bars produced according to the process of claim 1.

8. The method of forming a bar code according to claim 1, wherein each one of the combination of color ink droplets includes a combination of magenta, cyan and yellow ink droplets to form a black pixel.

9. A bar code having a plurality of bars, each one of said bars comprising:

a leading edge having a black colorant deposited thereon;

a trailing edge having said black colorant deposited thereon; and a center region having a composite of said black colorant and a second colorant deposited thereon, wherein each individual bar includes alternating column patterns of a column of black ink droplets and a column of combinations of color ink droplets wherein each one of the combinations of color ink droplets includes a combination of magenta, cyan and yellow ink droplets to form a black pixel.

10. A bar code according to claim 9, wherein said first colorant is black colorant.

11. A bar code according to claim 9, wherein said second colorant includes cyan colorant.

12. A bar code according to claim 9, wherein said second colorant includes magenta colorant.

13. A bar code according to claim 9, wherein said second colorant includes yellow colorant.

* * * * *